April 19, 1966 M. L. QUAMMEN ETAL 3,246,563
TELESCOPIC EYEPIECE ASSEMBLY WITH STATIC
AND DYNAMIC BELLOWS-TYPE SEAL
Filed Sept. 26, 1962 2 Sheets-Sheet 1

INVENTORS:
MILTON L. QUAMMEN
PATRICK J. CASSIDY
FRANK J. JORDAN
PAUL R. YODER JR.
BY S. J. Rotondi,
A. J. Dupont & S. Dubroff
ATTORNEYS INVENTORS:
MILTON L. QUAMMEN
PATRICK J. CASSIDY
FRANK J. JORDAN
PAUL R. YODER JR.

United States Patent Office 3,246,563
Patented Apr. 19, 1966

3,246,563
TELESCOPIC EYEPIECE ASSEMBLY WITH STATIC AND DYNAMIC BELLOWS-TYPE SEAL
Milton L. Quammen and Patrick J. Cassidy, Philadelphia, Pa., Frank J. Jordan, Riverside, N.J., and Paul R. Yoder, Jr., Wilton, Conn., assignors to the United States of America as represented by the Secretary of the Army
Filed Sept. 26, 1962, Ser. No. 227,121
1 Claim. (Cl. 88—57)

The invention described herein may be manufactured and used by or for the Government for governmental purposes without the payment to us of any royalty thereon.

This invention relates to eyepieces which are fabricated as an assembly or unit prior to their installation into the instrument of which they form a part. Such assemblies include an outer telescopic member, an inner telescopic member containing a group of lenses, and means for producing relative movement between the two telescopic members.

For the reason that these assemblies are exposed to the atmosphere prior to their installation, the inner telescope member or lens cell must be sealed to prevent the entrance of dirt, moisture or other contaminants. Since the telescopic members must be relatively movable, at least one of the seals must be capable of permitting such movement. This has been accomplished heretofore by a dynamic or bellows type seal between the two telescopic members. As previously used, however, such bellows seals have been disposed exterior to the lens cell or at some distance from the lenses grouped in the inner telescopic member. These arrangements are inapplicable in many cases where the space available for the dynamic seal is very limited. The present invention overcomes this difficulty by connecting the dynamic seal member or bellows at one end to the outer telescopic member and at the other end directly to the group of lenses located in the inner telescopic member.

The invention will be better understood from the following description when considered in connection with the accompanying drawings and its scope is indicated by the appended claim.

Figure 1:
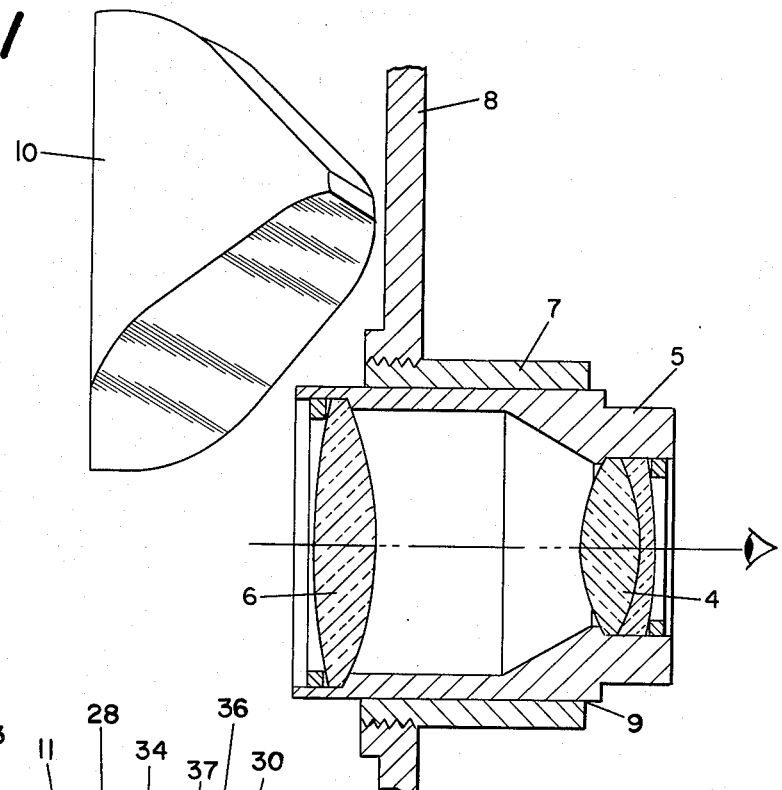
Figure 2:
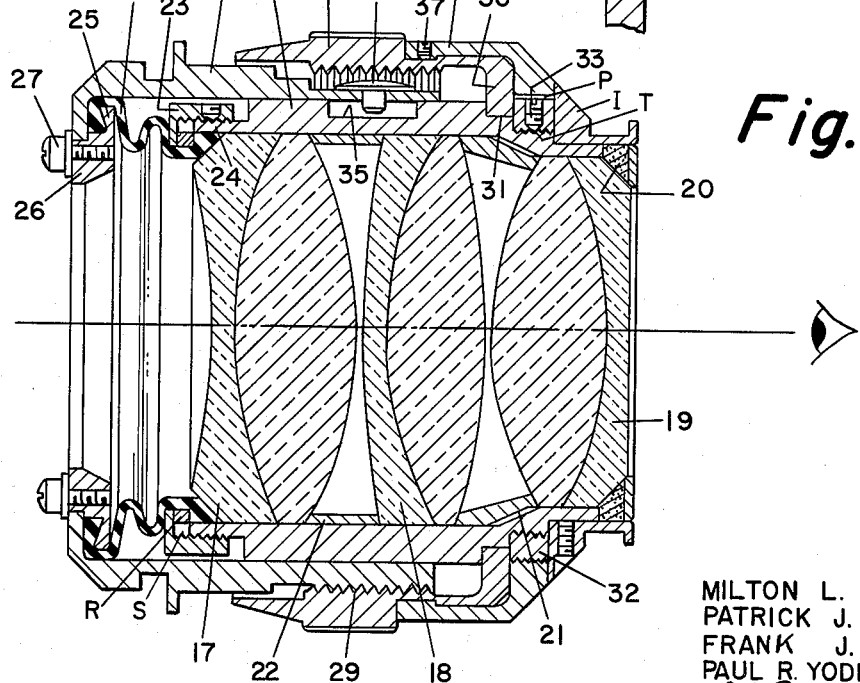
Figure 3:
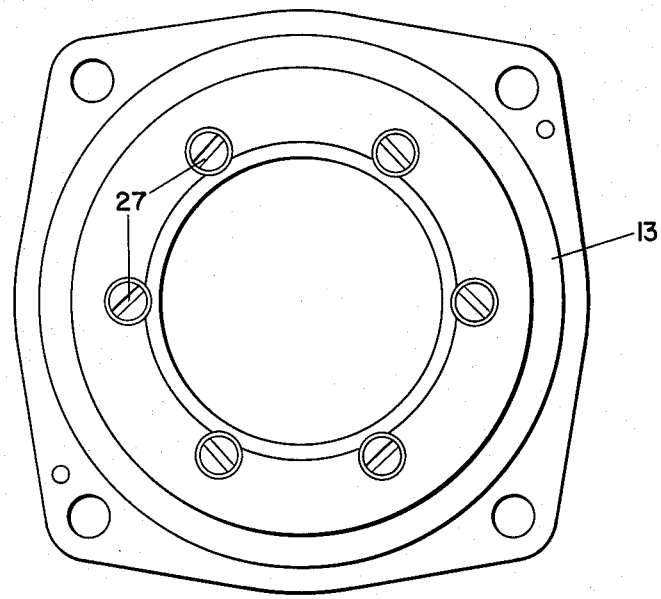
Figure 4:
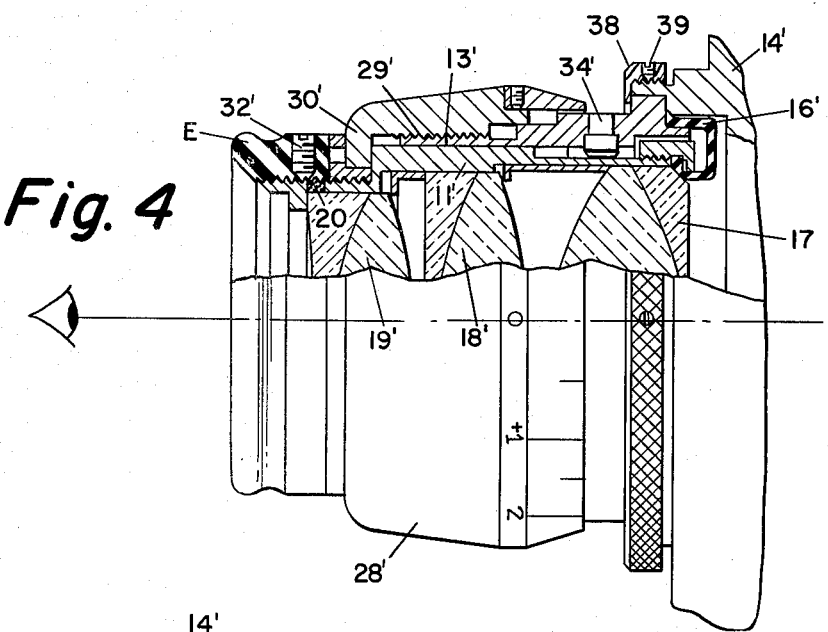
Figure 5:
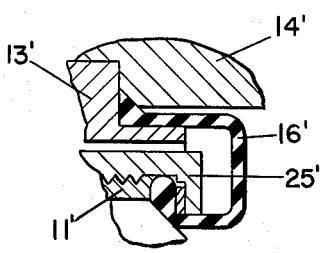

FIG. 1 is an explanatory diagram illustrating schematically the various static and dynamic seals required in a typical instrument of the type under consideration, FIGS. 2 and 3 illustrate the invention, as applied to a spotting optical instrument, FIG. 4 illustrates the invention as applied to a binocular, FIG. 5 is an enlarged view of the bellows assembly of FIG. 4.

FIG. 1 indicates the static and dynamic seals required in a typical focussing eyepiece of an optical instrument, the translating mechanism being omitted. It can be seen from this figure that static seals are required between an eye lens 4 and an eyepiece cell 5, between field lens 6 and cell 5 and between the eyepiece housing member 7 and the instrument housing 8. It will also be observed that a dynamic seal 9 is required between the cell 5 and the eyepiece housing member 7. The problem solved by the present invention was presented by the limited space between the innermost lens 6 of the eyepiece and the prisms 10 used in the instrument to erect the image.

In the modification of FIGS. 2 and 3, this problem is solved by the provision of dynamic seal or bellows 16 between the eyepiece housing member 13 and a lens 17 which, together with lenses 18 and 19, is mounted in cell 11. The lens 19 is sealed to the cell 11 by a static seal 20 consisting of a sealing compound. The lenses 18 and 19 are spaced apart by a separator 21. The lenses 17 and 18 are spaced apart by a separator 22.

A tight seal between the bellows 16 and the lens 17 is effected by means of a clamping ring 23 which is threaded onto one end of the cell 11 and is fixed in its tightened position by a screw 24. A typical thrust ring R, for imparting pressure against the bellows from the clamping ring, and a space S between the thrust ring and the clamping ring provides generally uniform pressure of the bellows against the lens. At its other end, the bellows 16 is clamped between a ring 25 and an inwardly extending flange 26 of the housing member 13, this being accomplished by means of screws 27. This construction permits movement of the cell 11 with respect to the housing member 13.

An adapter 28 coupled to the eyepiece housing member 13 by a thread 29 therebetween functions to produce this movement of the cell 11 by means of an inwardly extending flange 30. This flange rests in a groove 31 formed by a recess in the cell 11 and a ring 32 which is fixed to the cell by screws 33. Screws 33 have a tip T for penetration into cell 11 and a space P is provided above the head of the screws 33. Movement of the cell upon rotation of the adapter 28 is limited to an axial direction by means of a stop pin 34 which is fixed to the eyepiece housing member 13 and rides in a slot or groove 35 in the cell 11. This is essential for the reason that rotation of the cell as it is translated axially would create torsional stress in the bellows 16 and cause it to fracture or otherwise fail. Adjustably associated with the adapter 28 is a fixed member 36 which bears a mark (not shown) cooperating with a scale on the adapter. The fixed member 36 has a groove in which a screw 37 rides, this screw being fixed to the adapter. A typical index piece diopter scale I is mounted inwardly member 36 and also receives a rubber eye shield E, one form of which is shown in FIG. 4.

It can be seen from FIGS. 2, 3, 4 and 5 that the principal differences between the modification of FIGS. 2 and 3 and those of FIGS. 4 and 5 are (1) the form of the bellows and (2) the use of the bellows both to seal the cell to a lens and to seal the eyepiece housing member to the instrument housing. This is accomplished by means of ring 25' which is threaded onto the end of the cell 11' and a collar 38 which is threaded onto the instrument housing 14' and is fixed in its tightened position by a screw 39. This structure has the important advantage that the bellows 16' functions to form a dynamic seal between the lens cell 11' and its housing 13' and to form static seals between the lens 17' and the cell 11' and between the housings 13' and 14'. One dynamic and two static seals are thus made with a single molded member of rubber or the like and all this is accomplished within a very limited space. An eyepiece E, suitably of plastic, is attached to the eyepiece assembly by means well known in the art.

The overall physical size of the eyepiece assembly sealed by the above described method is essentially the same as if the same assembly were sealed with O-rings, lubricant or sealing compound. The problem of lubricant leakage or O-ring wear by the focussing movement of the eyepiece is avoided. The slight flexure of the bellows as the eyepiece is moved introduces little strain on the bellows so that operation at the extreme temperaures normally encountered by military optical instrument is both possible and practical without reduction in the effectiveness of the pressure tight seal of the instrument. Tests of instruments sealed as above described showed that pressure differentials of five pounds per square inch caused a pressure drop due to leakage of no more than .05 pounds per square inch in one hour. This degree of sealing approaches that attained with optical instruments having no dynamic seals and far exceeds the level attained by prior art compact arrangements.

We claim:

An optical apparatus comprising an eyepiece assembly including a lens cell, a plurality of lenses spaced within said cell and comprising an innermost lens and an outermost lens, an eyepiece housing concentrically mounted about a portion of said lens cell, an instrument housing receiving said eyepiece housing at an inner portion thereof, a flexible bellows-type seal having a first end disposed between said lens cell and said innermost lens, a ring threadedly mounted onto the innermost end portion of said lens cell and having a depending flange, said depending flange of said ring statically clamping said first end of said bellows seal against the peripheral portion of said innermost lens and said innermost end portion of said lens cell, a collar threadedly mounted to an outermost portion of said instrument housing and disposed generally concentrically about said eyepiece housing, said collar statically clamping the opposite end of said bellows between said instrument housing and the inner end portion of said eyepiece housing, an adapter threadedly mounted about said eyepiece housing having an inwardly extending flange, said inwardly extending flange rotatably connected to an outer portion of said lens cell, an upper axial slot disposed in said lens cell, a stop pin affixed to a portion of said eyepiece housing riding in said axial slot whereby rotation of said adapter causes axial movement of the lens cell in relation to said eyepiece housing and said bellows acts as a dynamic seal between the lens cell and the eyepiece housing.

References Cited by the Examiner

UNITED STATES PATENTS

| | | | |
|---|---|---|---|
| 2,320,504 | 6/1943 | Bailey | 88—34 |
| 2,851,924 | 9/1958 | Beusker | 88—32 |

FOREIGN PATENTS

| | | |
|---|---|---|
| 1,013,260 | 4/1952 | France. |
| 362,725 | 12/1931 | Great Britain. |
| 777,648 | 6/1957 | Great Britain. |
| 402,486 | 10/1942 | Italy. |

DAVID H. RUBIN, *Primary Examiner.*